US010823930B2

(12) United States Patent
Hoshino

(10) Patent No.: US 10,823,930 B2
(45) Date of Patent: Nov. 3, 2020

(54) OPTICAL FIBER CABLE AND OPTICAL FIBER CABLE MANUFACTURING METHOD

(71) Applicant: FURUKAWA ELECTRIC CO., LTD., Tokyo (JP)

(72) Inventor: Yutaka Hoshino, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/557,232

(22) Filed: Aug. 30, 2019

(65) Prior Publication Data

US 2019/0384027 A1 Dec. 19, 2019

Related U.S. Application Data

(63) Continuation of application No. PCT/JP2018/009474, filed on Mar. 12, 2018.

(30) Foreign Application Priority Data

Mar. 13, 2017 (JP) ................................ 2017-047234

(51) Int. Cl.
*G02B 6/44* (2006.01)
(52) U.S. Cl.
CPC .......... *G02B 6/448* (2013.01); *G02B 6/4429* (2013.01)
(58) Field of Classification Search
CPC .................................................... G02B 6/448
See application file for complete search history.

(56) References Cited

U.S. PATENT DOCUMENTS

| | | | | |
|---|---|---|---|---|
| 8,620,124 B1* | 12/2013 | Blazer | ................. | G02B 6/4494 385/102 |
| 2008/0285925 A1* | 11/2008 | Graveston | ............ | G02B 6/4432 385/107 |
| 2019/0384027 A1* | 12/2019 | Hoshino | ................. | G02B 6/448 |

FOREIGN PATENT DOCUMENTS

| | | | | |
|---|---|---|---|---|
| CN | 104267473 A | 1/2015 | | |
| CN | 104312057 A | 1/2015 | | |
| CN | 105842803 A | 8/2016 | | |
| EP | 3306368 A1 * | 4/2018 | ............... | G02B 6/44 |
| JP | 9-049950 A | 2/1997 | | |
| JP | 09049950 A * | 2/1997 | | |
| JP | 2004-020606 A | 1/2004 | | |
| JP | 2005-031138 A | 2/2005 | | |

(Continued)

OTHER PUBLICATIONS

International Search Report issued in PCT Patent Application No. PCT/JP2018/009474 dated May 22, 2018.

(Continued)

*Primary Examiner* — Rhonda S Peace
(74) *Attorney, Agent, or Firm* — Marshall, Gerstein & Borun LLP

(57) ABSTRACT

An optical fiber cable is a slot-less type optical fiber cable not using a slot, and is provided with: a plurality of optical fiber core wires; a presser-winding member; a linear body; a tension member; a tear cord; a jacket, etc. The presser-winding member is provided to the outer circumference of the optical fiber core wires. A cable core on which the linear body is wound is formed on the outer circumference of the presser-winding member. The linear member wound on the outside of the presser-winding member has a thermal shrinkage of 0.2% or lower at a temperature of −40° C. to +85° C.

5 Claims, 2 Drawing Sheets

(56) References Cited

FOREIGN PATENT DOCUMENTS

| JP | 2005-070127 A |   | 3/2005 |
|----|---------------|---|--------|
| JP | 2005070127 A  | * | 3/2005 |
| JP | 2007199398 A  |   | 8/2007 |
| JP | 2013-037253 A |   | 2/2013 |
| JP | 2013037253 A  | * | 2/2013 |
| JP | 2013-109171 A |   | 6/2013 |
| JP | 2013109171 A  | * | 6/2013 |
| JP | 2016-218402 A |   | 12/2016 |
| JP | 2017-021153 A |   | 1/2017 |
| JP | 2017021153 A  | * | 1/2017 |

OTHER PUBLICATIONS

Office Action issued in Taiwan Patent Application No. 107108436 dated Jun. 10, 2019.
Office Action issued in Chinese Patent Application No. 201880017106.9 dated Apr. 27, 2020.
Office Action issued in Japanese Patent Application No. 201880017106.9 dated Apr. 27, 2020.

* cited by examiner

OPTICAL FIBER CABLE AND OPTICAL FIBER CABLE MANUFACTURING METHOD

TECHNICAL FIELD

The present disclosure relates to a slot-less optical fiber cable and the like.

BACKGROUND OF THE DISCLOSURE

Due to increase in amount of information in recent years, there is a growing demand for the amount of information transmitted per optical fiber cable to be increased. That is, it is desired for an optical cable to accommodate optical fibers more densely to increase the number of optical fibers to be accommodated. Accordingly, a slot-less optical fiber cable, which does not use a slot rod, has been proposed.

A slot-less optical fiber cable includes, for example, a plurality of optical fiber core wires (optical fibers) that are bundled together and wrapped by a presser-winding member (a wrapping member). In the slot-less cable, it is necessary to suppress shifting of the optical fibers after the cable is laid out in the field. As a criterion for force suppressing this shifting of the optical fibers, it has been proposed to use a core pulling force that is required to pull out the optical fiber from the optical fiber cable.

To obtain the required core pulling force, it has been known to wind a linear body around an outer side of the wrapping member (Japanese Unexamined Patent Application Publication No. 2004-020606 (JP-A-2004-020606), for example).

Also, optical fiber cables in which winding pitch and tension for the linear body to be wound around an outer periphery of the wrapping member are specified have been proposed (Japanese Unexamined Patent Application Publication No. 2005-70127 (JP-A-2005-70127) and Japanese Unexamined Patent Application Publication No. 2007-199398 (JP-A-2007-199398), for example).

However, when the optical fiber cable is under a temperature change, there may be a case in which the linear body winding around the outer periphery of the wrapping member thermally shrinks. Such shrinkage of the linear body may tighten the wrapping member beyond its elasticity range and may cause distortion of the optical fibers and an increase in transmission loss.

If the linear body thermally shrinks in this way, there is no chance for the length of the linear body to be restored to its original state later. Thus, the linear body keeps distorting the optical fibers, which leads to an increase in the transmission loss. Also, there is concern that continuous distortion given to the optical fibers may lead to breaking of the optical fibers.

SUMMARY OF THE DISCLOSURE

The present disclosure was made in view of such problems. Its object is to provide an optical fiber cable that can suppress an increase in transmission loss due to temperature change, and the like.

To achieve the above object, a first set of embodiments relates to an optical fiber cable including a plurality of optical fibers, a wrapping member that is provided on an outer periphery of the plurality of the optical fibers, a linear body that is wound around an outer periphery of the wrapping member, and an outer jacket that is provided on an outer periphery of the wrapping member and the linear body, wherein a thermal shrinkage ratio of the linear body is 0.2% or less at temperatures between −40° C. and +85° C.

A plurality of the linear bodies may be wound around the outer periphery of the wrapping member.

The optical fibers may be intermittently bonded optical fiber ribbons.

According to the first embodiments, the linear body can hold the optical fibers that are wrapped by the wrapping member. Also, the thermal shrinkage of the linear body under temperature change is small. Thus, the linear body does not tighten the optical fibers inside excessively. For these reasons, an increase in transmission loss of the optical fibers can be suppressed.

Also, winding the plurality of the linear bodies can make a winding pitch per linear body larger while maintaining a winding interval between the linear bodies the same. This improves manufacturability. Also, it is possible to increase the winding pitch so the tightening force can be reduced.

Also, if the optical fibers are intermittently bonded optical fiber ribbons, the optical fibers do not come loose and, in addition, the optical fibers can be prevented from being applied by excessive stress when being bent.

A second set of embodiments relates to a method for manufacturing an optical fiber cable. The method includes steps of bundling a plurality of optical fibers, wrapping a wrapping member around an outer periphery of the optical fibers, winding a linear body to form a cable core, and extrusion coating an outer jacket onto an outer periphery of the cable core. The linear body is heat treated in advance so as to make a thermal shrinkage ratio thereof is 0.2% or less at temperatures between −40° C. and +85° C.

A plurality of the linear bodies may be wound around the outer periphery of the wrapping member.

According to the second embodiments, the thermal shrinkage of the linear body due to temperature change can be suppressed.

Also, winding the plurality of the linear bodies can make the winding pitch per linear body larger while maintaining the winding interval between the linear bodies the same. This improves manufacturability. Also, it is possible to increase the winding pitch so the tightening force can be reduced.

The presently described embodiments can provide an optical fiber cable that can prevent an increase in transmission loss due to temperature change, and the like.

DETAILED DESCRIPTION

Figure 1:
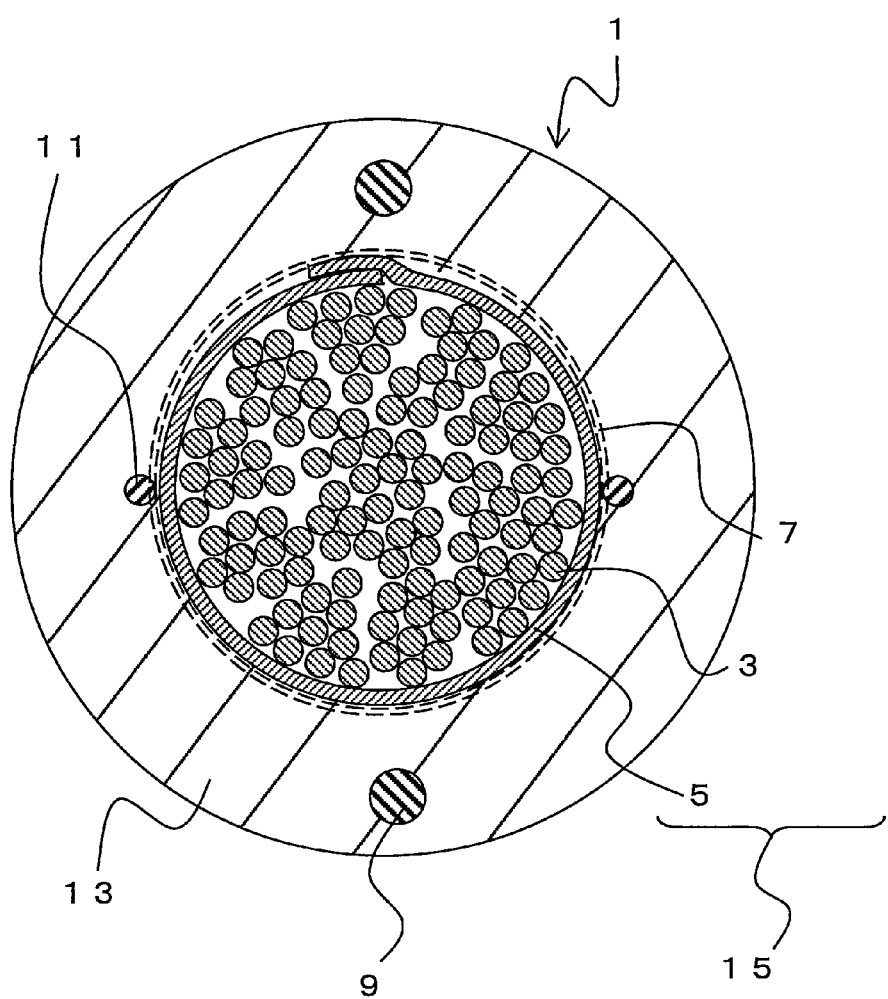
FIG. 1 is a cross sectional view showing an optical fiber cable 1.

Hereinafter, embodiments will be described with reference to the accompanying drawings. FIG. 1 shows an optical fiber cable 1. The optical fiber cable 1 is a slot-less optical fiber cable, in which a slot is not used. The optical fiber cable 1 includes a plurality of optical fiber core wires (optical fibers) 3, a presser-winding member (wrapping member) 5, a linear member 7, a tension member (strength member) 9, a tear cord (rip cord) 11, a jacket (an outer jacket) 13, and the like.

The optical fiber 3 is, for example, an optical fiber ribbon in which a plurality of optical fibers are arranged side by side, and is also an intermittently bonded optical fiber ribbon in which the adjacent optical fibers are intermittently bonded along a longitudinal direction thereof. In some cases, the plurality of optical fibers 3 are assembled together by a bundle material or the like to form an optical fiber unit.

The wrapping member 5 is provided on an outer periphery of the plurality of the optical fibers 3. The wrapping member 5 is disposed so as to wrap the plurality of the optical fiber units lengthwise, covering the optical fiber units as a whole. That is, a longitudinal direction of the wrapping member 5 substantially corresponds with an axial direction of the optical fiber cable 1, and the wrapping member 5 is wrapped around the outer periphery of the optical fibers 3 lengthwise so that a width direction of the wrapping member 5 corresponds with a circumference direction of the optical fiber cable 1.

A material for the wrapping member 5 can be appropriately selected without any particular limitations. For example, polyolefins (such as low-density polyethylene, high-density polyethylene, and polypropylene), polyamides (PA) (such as nylon-6, and nylon-12), polyacetals (POM), polyesters (such as PET, PEN, PTT, PBT, PPT, PHT, PBN, PES, and PBS), syndiotactic polystyrene (SPS), polyphenylene sulfides (PPS), polyether ether ketones (PEEK), liquid crystal polymers (LCP), fluorine resin, or isotactic polypropylene (isoPP) may be used. Among the above, from a perspective of durability, dynamic strength, and costs, polyolefins, polyesters, and syndiotactic polystyrene (SPS) are preferable, and polyesters are further more preferable.

For the wrapping member 5, a film (tape) that is either uniaxially or biaxially oriented may be used, for example. Considering tensile force in cable forming process, it is preferable to use a biaxially oriented film. Other than that, a non-woven tape may be used. A non-woven tape laminated with a film may also be used. Also, to improve removability of the outer jacket 13, which will be described below, a tape having a surface coated with a lubricant such as oil, wax, or silicone may be used, or a tape having a rough processed surface, for example, can also be used.

Figure 2:
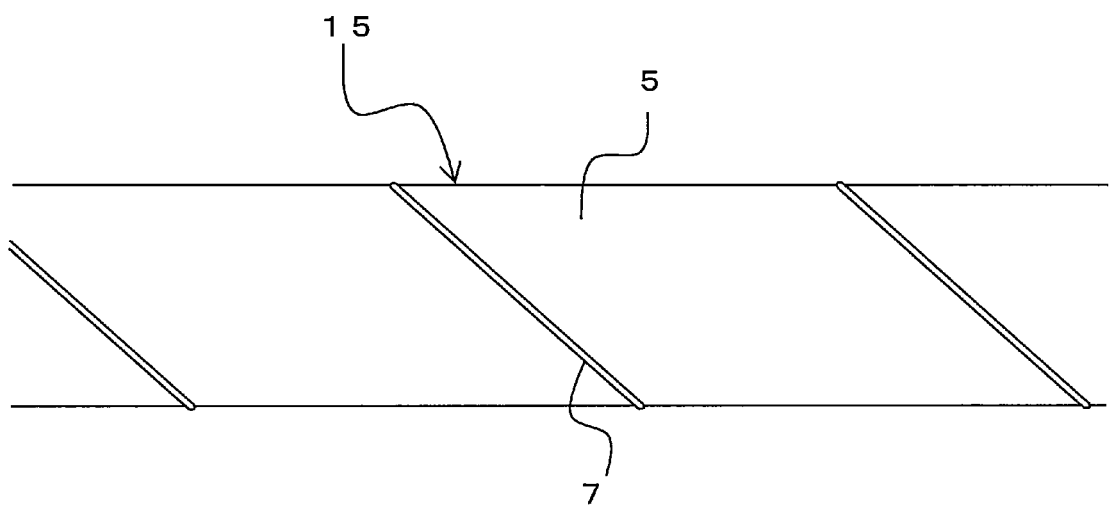
FIG. 2 is a drawing showing a winding state of a linear body 7.

The linear body 7 is wound around an outer periphery of the wrapping member 5 to form a cable core 15. FIG. 2 is a side view of the cable core 15. The linear body 7 is wound spirally around the outer periphery of the wrapping member 5.

There may be one or plurality of the linear bodies 7. For example, if three linear bodies 7 are wound with a winding pitch that is three times more than that of one linear body 7, the winding interval for one linear body 7 still remains the same. Thus, the number of winding times of the linear body 7 can be reduced.

Here, the linear body 7 that is wound around the outer periphery of the wrapping member 5 has a thermal shrinkage ratio of 0.2% or less at temperatures between −40° C. and +85° C. By winding the linear body 7 having the thermal shrinkage ratio of 0.2% or less around the outer periphery of the wrapping member 5, even if there is a change in temperature, the distortion applied onto the optical fibers 3 is small and the increase in transmission loss can be suppressed. As such the linear body 7, for example, a thread made of nylon, polyester, polypropylene, polyethylene, or the like, or a tape like body is applicable. The thermal shrinkage ratio of the linear body 7 at temperatures between −40° C. and +85° C. is normally 0% or more.

The outer jacket 13 is provided on an outer periphery of the cable core 15. The outer jacket 13 is a layer that covers and protects the optical fiber cable 1. On a cross section take perpendicularly to the longitudinal direction of the optical fiber cable 1, a pair of the strength members 9 are provided inside the outer jacket 13 at positions that are facing each other with the cable core 15 therebetween. The strength member 9 is a steel wire, for example.

Also, the rip cords 11 are provided in a direction substantially perpendicular to the facing direction of the strength members 9, facing each other with the wrapping member 5 therebetween. The strength members 9 and the rip cords 11 are embedded in the outer jacket 13.

Next, a method for manufacturing the optical fiber cable 1 will be described. First, a plurality of the optical fibers 3 are bundled together and an interposition is disposed on the outer periphery of the optical fibers 3 as necessary. Next, the wrapping member 5 is wrapped around the outer periphery of the optical fibers 3 lengthwise so as to cover the plurality of the optical fibers 3 as a whole.

Next, the linear body 7 is spirally wound around the outer periphery of the wrapping member 5 to prevent opening of the wrapping member 5. As mentioned above, the linear body 7 is selected from those having the thermal shrinkage ratio of 0.2% or less at temperatures between −40° C. and +85° C. The thermal shrinkage ratio of the linear body 7 at temperatures between −40° C. and +85° C. is normally 0% or more.

The thermal shrinkage ratio of the linear body 7 can be easily adjusted by heat treating the linear body 7 before winding. That is, the linear body 7, which is heat treated in advance to have the thermal shrinkage of 0.2% or less at temperatures between −40° C. and +85° C., is prepared and wound around the outer periphery of the wrapping member 5 to form the cable core. For example, heat treating the linear body 7 made of polyester at the temperatures between 100° C. and 130° C. can reduce the thermal shrinkage ratio of the linear body 7 to 0.2% or less after winding.

After that, for example, the outer jacket 13 is extrusion coated onto the outer periphery of the wrapping member 5 and the linear body 7. Accordingly, the optical fiber cable 1 is manufactured.

As above, the optical fiber cable 1 of the present embodiment includes the linear body 7 of which the thermal shrinkage ratio is less than a predetermined value within a range of working condition of the optical fiber cable 1. This can suppress the amount of thermal shrinking of the linear body 7 due to temperature change. Thus, the optical fibers 3 inside are never tightened excessively and the increase in transmission loss can be suppressed.

Also, in the method for manufacturing the optical fiber cable 1 according to the present embodiment, the linear body 7 is given heat treatment before being wound around the outer periphery of the wrapping member 5 so the thermal shrinkage ratio of the linear body 7 can be adjusted as desired.

Also, by winding the plurality of the linear bodies 7, even if the linear bodies 7 are wound at the same winding interval as the winding interval for the one linear body 7, it is possible to make the winding pitch of each of the linear bodies 7 longer. Increasing the winding pitch of the linear body 7 in this way can suppress excessive tightening of the optical fibers 3 inside when the linear body 7 shrinks.

The present embodiments are not limited to the optical fiber cable 1 having a cross section shown in FIG. 1 and may have other cross sections. For example, the optical fiber cable 1 may be a self-supporting optical cable having a supporting wire.

Working Examples

Optical fiber cables are made with various types of linear bodies, and heat cycle test is performed thereto. Also, transmission loss after the heat cycle test is evaluated for each of the optical fiber cables. The structure shown in FIG. 1 is used for the optical fiber cables.

As the linear body to be wound around the outer periphery of the wrapping member, a polyester thread of 500 denier is used. Also, the amount of shrinkage of the polyester thread is adjusted before winding by adjusting an annealing time. The shrinkage ratio is calculated by leaving the thread of 1 m between gauge marks in a thermostatic tank at temperatures of −40° C. and +85° C. for ten hours and measuring the length of the thread between the gauge marks to calculate the amount of shrinkage from the initial value.

These linear bodies are used to make cables below. Four optical fibers are arranged parallel to each other and are bonded intermittently by using adhesive resin to form an intermittently bonded optical fiber ribbon. Ten of these intermittently bonded optical fiber ribbons are twisted together and the wrapping member is wrapped lengthwise therearound.

A non-woven tape is used as the wrapping member. Each of the linear bodies is wound with a pitch of 30 mm around an outer periphery of the non-woven tape that is wrapped lengthwise. Then, two steel wires each having a diameter of 0.7 mm, rip cords, and an outer jacket are provided to form the optical fiber cable.

Heat cycle test is performed on each of the obtained optical fiber cables. First the optical fibers are put inside the thermostatic tank at temperatures of −40° C. and +85° C. Then, for each of the optical fiber cables, the increase in transmission loss at a wavelength of 1.55 μm before and after the heat cycle test is measured. Those with the increase in transmission loss of 0.10 dB or less are rated as 'Good', and those with the increase in transmission loss of over 0.10 dB are rated as 'Bad'. The results are shown in Table 1.

TABLE 1

|  |  | No. 1 | No. 2 | No. 3 | No. 4 | No. 5 | No. 6 | No. 7 |
|---|---|---|---|---|---|---|---|---|
| Linear Body Shrinkage Ratio (%) | −40° C. | 0.15 | 0.10 | 0.15 | 0.18 | 0.20 | 0.20 | 0.25 |
|  | +85° C. | 0.15 | 0.15 | 0.18 | 0.18 | 0.20 | 0.25 | 0.25 |
| Increase in Loss after Heat Cycle |  | Good | Good | Good | Good | Good | Bad | Bad |

According to the results, for the optical fiber cables No. 1 to No. 5 having the thermal shrinkage ratio of 0.20% or less at the temperatures between −40° C. and +85° C., the increase in transmission loss after heat cycle test is 0.10 dB or less, which is rated as 'Good'. On the other hand, for the optical fiber cables No. 6 and No. 7 having the thermal shrinkage ratio of more than 0.20% at the temperatures between −40° C. and +85° C., the increase in transmission loss after heat cycle test exceeds 0.10 dB, which is rated as 'Bad'.

Although the presently described embodiments have been described referring to the attached drawings, the technical scope is not limited to the embodiments described above. It is obvious that persons skilled in the art can think out various examples of changes or modifications within the scope of the technical idea recited by the claims, and it will be understood that they naturally belong to the technical scope of the claims.

What is claimed is:

1. An optical fiber cable comprising:
   a plurality of optical fibers;
   a wrapping member that is provided on an outer periphery of the plurality of the optical fibers;
   a linear body that is wound around an outer periphery of the wrapping member; and
   an outer jacket that is provided on an outer periphery of the wrapping member and the linear body,
   wherein a thermal shrinkage ratio of the linear body is 0.2% or less at temperatures between −40° C. and +85° C., and
   wherein an increase in transmission loss at a wavelength of 1.55 μm before and after heat cycle test is 0.10 dB or less at temperatures between −40° C. and +85° C.

2. The optical fiber cable according to claim 1, wherein a plurality of the linear bodies are wound around the outer periphery of the wrapping member.

3. The optical fiber cable according to claim 1, wherein the optical fibers are intermittently bonded optical fiber ribbons.

4. A method for manufacturing an optical fiber cable comprising:
   bundling a plurality of optical fibers;
   wrapping a wrapping member around an outer periphery of the optical fibers;
   winding a linear body around an outer periphery of the wrapping member to form a cable core, the linear body being heat treated in advance so as to make a thermal shrinkage ratio of the linear body 0.2% or less at temperatures between −40° C. and +85° C. and such that an increase in transmission loss at a wavelength of 1.55 μm before and after heat cycle test is 0.10 dB or less at temperatures between −40° C. and +85° C.; and
   extrusion coating an outer jacket onto an outer periphery of the cable core.

5. The method for manufacturing an optical fiber cable according to claim 4, wherein a plurality of the linear bodies are wound around the outer periphery of the wrapping member.

* * * * *